(12) United States Patent
Liu et al.

(10) Patent No.: US 10,766,143 B1
(45) Date of Patent: Sep. 8, 2020

(54) VOICE CONTROLLED KEYBOARD TYPING USING COMPUTER VISION

(71) Applicant: Amazon Technologies, Inc., Seattle, WA (US)

(72) Inventors: Zongyi Liu, Redmond, WA (US); Bruce Ferry, Seattle, WA (US); Kun Chen, Seattle, WA (US); Andrew Becker, London (GB)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 16/188,738

(22) Filed: Nov. 13, 2018

(51) Int. Cl.
| G06K 9/00 | (2006.01) |
| B25J 9/16 | (2006.01) |
| G10L 15/26 | (2006.01) |
| G06F 3/023 | (2006.01) |

(52) U.S. Cl.
CPC ............. *B25J 9/1697* (2013.01); *B25J 9/163* (2013.01); *G06F 3/023* (2013.01); *G06K 9/00671* (2013.01); *G10L 15/26* (2013.01)

(58) Field of Classification Search
CPC ......... B25J 9/1697; B25J 9/163; G06F 3/023; G06K 9/00671; G10L 15/26

USPC .......................................................... 382/153
See application file for complete search history.

(56) References Cited

U.S. PATENT DOCUMENTS

| 7,822,990 | B2* | 10/2010 | Varghese ................ G06F 21/36 713/182 |
| 9,053,350 | B1* | 6/2015 | Abdulkader ........... G06K 9/033 |
| 9,645,655 | B2* | 5/2017 | Dickenson .............. G06F 3/021 |
| 2008/0212877 | A1* | 9/2008 | Franco ................... G06K 9/033 382/182 |

* cited by examiner

*Primary Examiner* — Jonathan S Lee
(74) *Attorney, Agent, or Firm* — Kilpatrick Townsend & Stockton LLP

(57) ABSTRACT

Techniques for systems and methods that provide for utilizing a robotic system to type commands that correspond to voice commands using a keyboard of a device are described herein. In embodiments, an image of a device may be received from a camera. A keyboard region of the device may be determined based on a keyboard detection algorithm that uses the image. One or more characters in a portion of the image that corresponds to the keyboard region of the device may be detected based on a character detection algorithm. The one or more characters may be grouped into one or more groups based on the portion of the image. A character of a portion of character associated with a group may be edited based on an error detection algorithm.

20 Claims, 9 Drawing Sheets

VOICE CONTROLLED KEYBOARD TYPING USING COMPUTER VISION

BACKGROUND

The use of robots to perform a variety of tasks has increased as advancements in technology are made. A robot can be pre-programmed to perform actions that are highly repetitive. However, a pre-programmed robot may fail to perform a desired action if the robot encounters new environments or circumstances. For example, a pre-programmed robot that encounters a situation for the first time may lack the intelligence to perform any function or perform an incorrect function given the circumstances. Conventional robots require human oversight and correction to aid in the decision-making ability of the robot.

BRIEF DESCRIPTION OF THE DRAWINGS

Various embodiments in accordance with the present disclosure will be described with reference to the drawings, in which.

DETAILED DESCRIPTION

Figure 1:
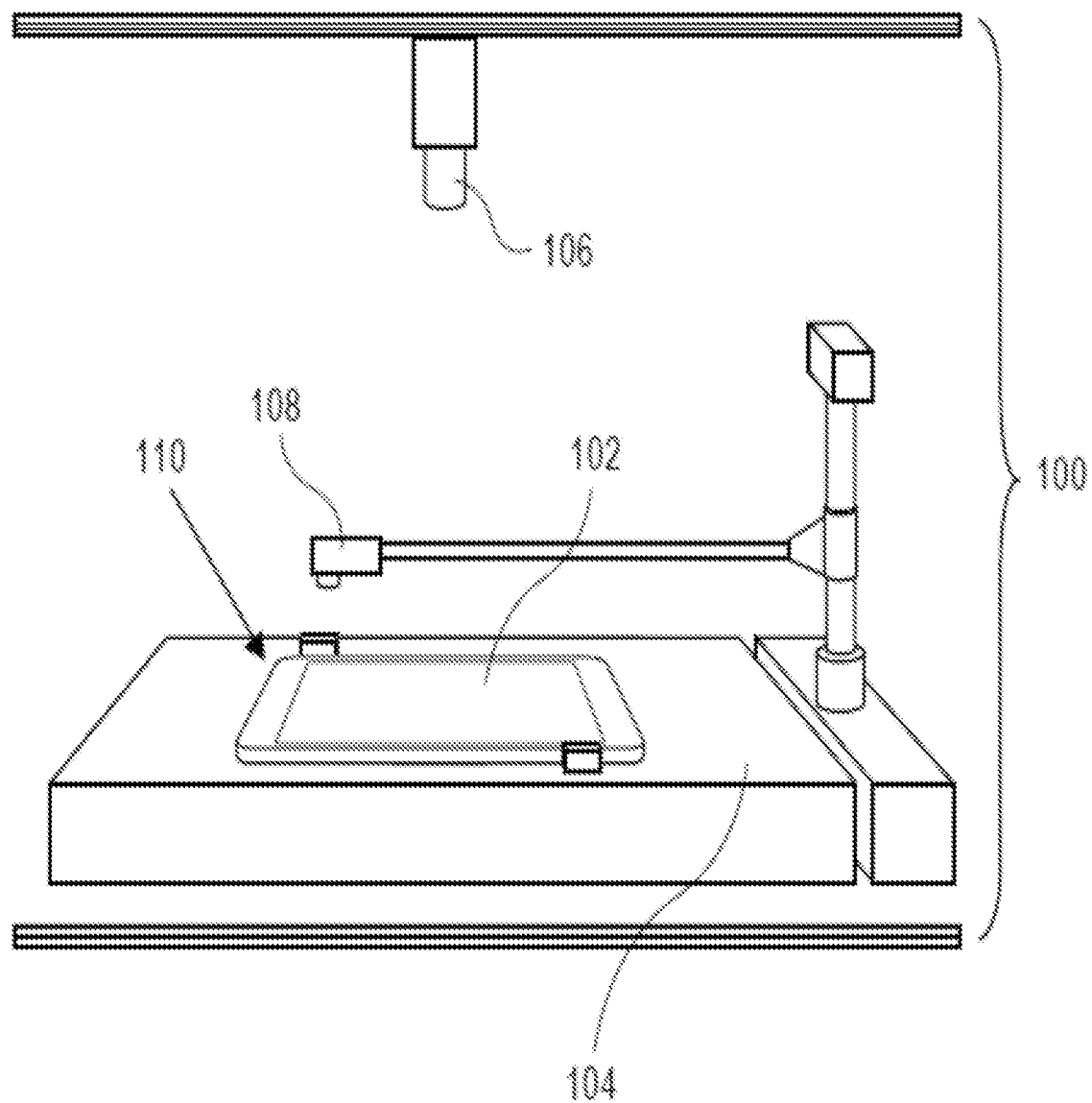
FIG. 1 depicts an example robot assisted system for implementing a keyboard detection feature that includes a device mounting station, a camera, a robot arm, and a controller, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for a keyboard detection feature that is configured to identify a keyboard region and individual characters in a keyboard region for a device. In embodiments, the keyboard detection feature generates a pixel-to-coordinate map for instructing a robot-assisted system to interact with the device on behalf of a user to execute inputs provided by a user's voice commands. As such, a user can provide voice commands such as "respond to the text message with: see you at 5 PM" and a speech-to-text device associated with the robot-assisted system can implement the input by interacting with the device via a robot arm and tip or manipulator. A user with hand injuries or disabilities may interact with his or her device by providing voice commands which are interpreted and mapped out to a plurality of movements that are executed by the robot-assisted system to appropriately execute the input of the voice command by identifying the keyboard region and characters within the keyboard region of the device.

In accordance with at least one embodiment, the keyboard detection feature, implemented by a service provider computer, may utilize a keyboard detection algorithm that uses an image of a device to identify the portion of the image that corresponds to a keyboard of the device (keyboard region). In embodiments, the keyboard detection algorithm may be configured to identify or detect multiple keyboard regions in the image for devices that include multiple keyboards or keyboard configurations. The keyboard detection feature may include using a character detection algorithm to identify each character (isolated character) in the portion of the image that includes the detected keyboard region. The keyboard detection feature may group the characters into one or more lines or groups for identifying and correcting errors in the character detection algorithm. For example, an error detection algorithm may identify and correct characters that were occluded in the image of the device (a finger or shadow), identify and correct false positive characters, and identify and correct a miss-classified character. In embodiments, an example of a false positive character identification and correction may include a comparison between a correct group for the keyboard region that comprises the characters "1234567890" and the identified group characters from the image of "a12345." In embodiments, the error detection algorithm would drop the "a" character. A miss-classification error may include a comparison between a correct group for the keyboard region that comprises the characters "qwertyuiop" and the identified group characters from the image of "yuj op." In embodiments, the error detection algorithm would replace the "j" with an "i." In accordance with at least one embodiment, the error detection algorithm may utilize a position of a character compared with a known position of a character in a similar keyboard region of a device to identify and correct errors such as occlusions, false positives, or miss-classifications.

In accordance with at least one embodiment, the keyboard detection feature may be configured to periodically identify the keyboard region for a device based at least in part on updated images of the device or in response to executing a command with the robot-assisted system. For example, the robot-assisted system may be configured to capture and analyze an image of the device in response to executing a movement of an associated robot arm and tip that interacts with the device. The capture of an image and periodic identification of the keyboard region and isolated characters in the keyboard region can be used to identify a change in state of a keyboard. For example, on digital devices multiple keyboard characters can be supported by the same keyboard region but at different times and are only presented in response to certain character key interactions. In response to the potential state change of a keyboard, the system may be configured to periodically (e.g., every second, each frame of a video capture, every minute, etc.) detect the keyboard region and the characters in the keyboard region or, detect the keyboard region and the characters in the keyboard region in response to executing a command that corresponds to the input provided by a user. In embodiments, the robot-assisted system and/or the service provider computers may be configured to detect the keyboard region and the characters within the keyboard region by analyzing individual frames of a video or by analyzing an image of the device captured by a camera associated with the robot-assisted system.

The keyboard detection feature may identify a portion of upper case characters versus a portion of lower case characters to determine whether the characters are in an upper case or lower case state. For example, if a greater portion of the characters are detected as being in an upper case state, then the system may assign a state of "upper case" to the characters of the keyboard region. If a greater portion of the characters are detected as being in a lower case state, than the system may assign a state of "lower case" to the characters of the keyboard region. In accordance with at least one embodiment, the keyboard detection algorithm may be a supervised or unsupervised machine learning algorithm that uses thousands of images of keyboard regions from a plurality of devices to train the algorithm and map a received image of a keyboard region with an image of a keyboard region for a device. In embodiments, the keyboard detection algorithm may be configured to detect multiple keyboard regions for a device. The keyboard detection algorithm may be configured to identify the keyboard region and determine pixel coordinates in the image which correspond to the keyboard region of the device. In embodiments, the keyboard detection algorithm may modify the image and store the image with an outline that corresponds to the keyboard region in the portion of the image for further character detection purposes or pixel-to-coordinate mapping for the robot-assisted system. In embodiments, the keyboard detection algorithm may be trained with new images that correspond to new devices or keyboard configurations such that subsequent analysis using the keyboard detection algorithm will result in identifying the keyboard region of a new device or that corresponds to a new keyboard configuration.

In accordance with at least one embodiment, the character detection algorithm of the keyboard detection feature may be configured to utilize a supervised or unsupervised machine learning algorithm that both detects the characters in the keyboard region of the image and recognizes the character that is detected as a specific character. The algorithm may utilize thousands of images of characters from a plurality of devices to compare and map a detected character in the image and decode or recognize the specific character. The character detection algorithm may associate each detected and recognized character with a unique class where each unique class corresponds to a particular alpha-numeric character or special control character (e.g., return, backspace, whitespace, tab, etc.). In accordance with at least one embodiment, the character detection algorithm may scale the image to an aspect ratio of 2 to 1 that may correspond to a 512×256 resolution. In embodiments, the keyboard detection feature may group the detected and recognized characters into one or more groups or lines based at least in part on their location within the keyboard region and a size associated with each character. In embodiments, images of detected keyboard regions and characters may be utilized to group the characters in a keyboard region of an image into a particular group. The keyboard detection feature may group alpha-numeric characters that do not correspond to the special control characters into groups. An orientation of the device in the image or the detected keyboard region in the image may be utilized to group the characters into one or more groups. For example, the characters that share a horizontal orientation with respect to the device may be grouped into the same group.

The processes and systems described herein may be an improvement on conventional character recognition systems and in particular in conventional optical character recognition techniques associated with devices. For example, conventional character recognition systems may be configured to identify words and phrases while lacking the functionality to detect and recognize individual or specific characters in a keyboard region of a device. This can lead to mechanisms which do not allow for users to provide granular input related to specific characters, such as typing out words one letter at a time or utilizing special control characters. Moreover, conventional systems may lack the functionality to change a state of a digital keyboard and access another set of characters supported by a device. The methods and systems described herein can provide for efficient detection and recognition of individual or isolated characters which can support voice commands that can include granular character by character input in a robot-assisted system. As the keyboard detection feature described herein can be implemented in a robot-assisted system, a user may provide voice commands which can be interpreted by the system to provide a hands free interaction with the device for users who have disabilities or hand injuries. The keyboard detection features described herein can isolate keyboard regions of a device to detect and recognize characters that correspond to a keyboard of a device to support the hands-free interaction of a user with the device and access a number of functions on the device that conventional systems are unable to provide.

FIG. 1 depicts an example robot assisted system for implementing a keyboard detection feature that includes a device mounting station, a camera, a robot arm, and a controller, in accordance with at least one embodiment. FIG. 1 includes a robot-assisted system 100 for implementing the keyboard detection features described herein. The robot-assisted system 100 of FIG. 1 may include a computing device (device) 102 placed in a mounting station 104 that is configured to physically hold the device 102, a camera 106 configured to capture images of the device 102, a robotic arm 108, and a tip or manipulator 110 for interacting with the device 102. In embodiments, the robotic arm 108 and tip 110 may be configured to move within or around the mounting station 104 and interact with the device 102 such as by performing a plurality of movements that cause the tip 110 to touch individual characters on a keyboard of device 102. The plurality of movements may correspond to input derived from a voice command that is received by a speech-to-text device (not pictured) that is associated with the robot-assisted system 100. In embodiments, the robotic arm 108 (robot arm) may include any suitable robot controlled mechanism for moving to an X and Y coordinate and performing a Z action such as by having the tip 110 interact with the device 102. An example of the robotic arm 108 may be a gantry arm in a gantry system that uses rails to move to an X and Y coordinate and perform a Z action.

In embodiments, the mounting station 104 may be configured to physically hold the device 102 in various and different positions. For example, the mounting station 104 may be configured to hold the device 102 such that the display screen of the device 102 or the keyboard region of the device is aligned with a predefined reference point. The mounting station 104 may include an adjustment guide that can help a user mount the device 102 in a designated position or orientation. In embodiments, the device 102 may include a mechanical keyboard or a touch-sensitive display screen that is associated with a keyboard region (the area of the screen that includes characters for interacting with individual keys of the device 102). The device 102 may be mounted in the robot-assisted system 100 and the mounting station 104 such that the display screen of the device 102 is facing the camera 106. In embodiments, the device 102 can include a stand-alone display screen that is in communication with a computer (such as being wired to a desktop computer or communicating wirelessly with another computing device) that is not necessarily contained within the same housing as the screen. The camera 106 may be mounted at a predefined distance away from the mounting station 104 and device 102. The distance between the camera 106 and mounting station 104 and device 102 may be adjustable within the robot-assisted system 100. The camera 106 may be configured to periodically capture images of the device 102. The camera 106 may be configured to capture videos of the device 102.

The robotic arm 108 and tip 110 may be configured to move and touch the keyboard or touch-sensitive screen of device 102. Although the phrase "robotic arm" is used in the present figure to refer to the robotic arm 108, the phrase as used in the current disclosure can refer to the robotic arm 108 as well as mechanisms within the robot-assisted system 100 for moving the robotic arm 108 and tip 110 such as rails (not pictured). The robotic arm 108 may be any mechanical arm with at least two or three degrees of freedom. The robot-assisted system 100 and/or the service provider computers may generate and maintain a coordinate system that corresponds to a pixel location of the keyboard region of the device 102 as described herein. For example, the robot-assisted system 100 may determine a set of coordinate values of a pixel in the image captured by the camera 106 of the device 102 that correspond to the keyboard region of the device 102. The set of coordinate values may correspond to any number of the corner pixels (e.g., bottom-left pixel, bottom-right pixel, top-left pixel, and/or top-right pixel) or other pixels in the image such as control characters of the keyboard region of device 102. The robot-assisted system 100 and/or service provider computers may determine an x-coordinate value and y-coordinate value of a pixel in the keyboard region of the image.

The determined coordinate values may indicate the location of the pixel within the keyboard region of the image of the device 102. As used herein, the phrase "set of coordinate values" may refer to a pair of coordinate values (e.g., the x-coordinate value and the y-coordinate value of a pixel in a 2-dimensional space, such as the keyboard region of the device 102 included in the image captured by camera 106), a group of three coordinate values (e.g., x-, y-, and z-coordinate values of a pixel in 3-dimensional space), or a group of any number of coordinate values (e.g., including a single coordinate value) in any other coordinate system. The robot-assisted system 100 and/or service provider computers may calculate one or more transformation parameters to be used to convert a given set of coordinate values in a camera coordinate system to a corresponding set of coordinate values in a robotic arm coordinate system as described in U.S. application Ser. No. 15/648,284, titled "Automatic Detection of Screen Area and Camera Assisted Movement of Robotic Arm." The keyboard detection feature described herein may be configured to instruct the robot arm 108 and tip 110 to perform a plurality of movements that cause the robot arm 108 and tip 110 to interact with the device 102 within the mounting station 104. The plurality of movements executed by the robotic arm 108 and tip 110 may correspond to input that is associated with a voice-command provided by a user and converted by an associated speech-to-text device (not pictured).

Figure 2:
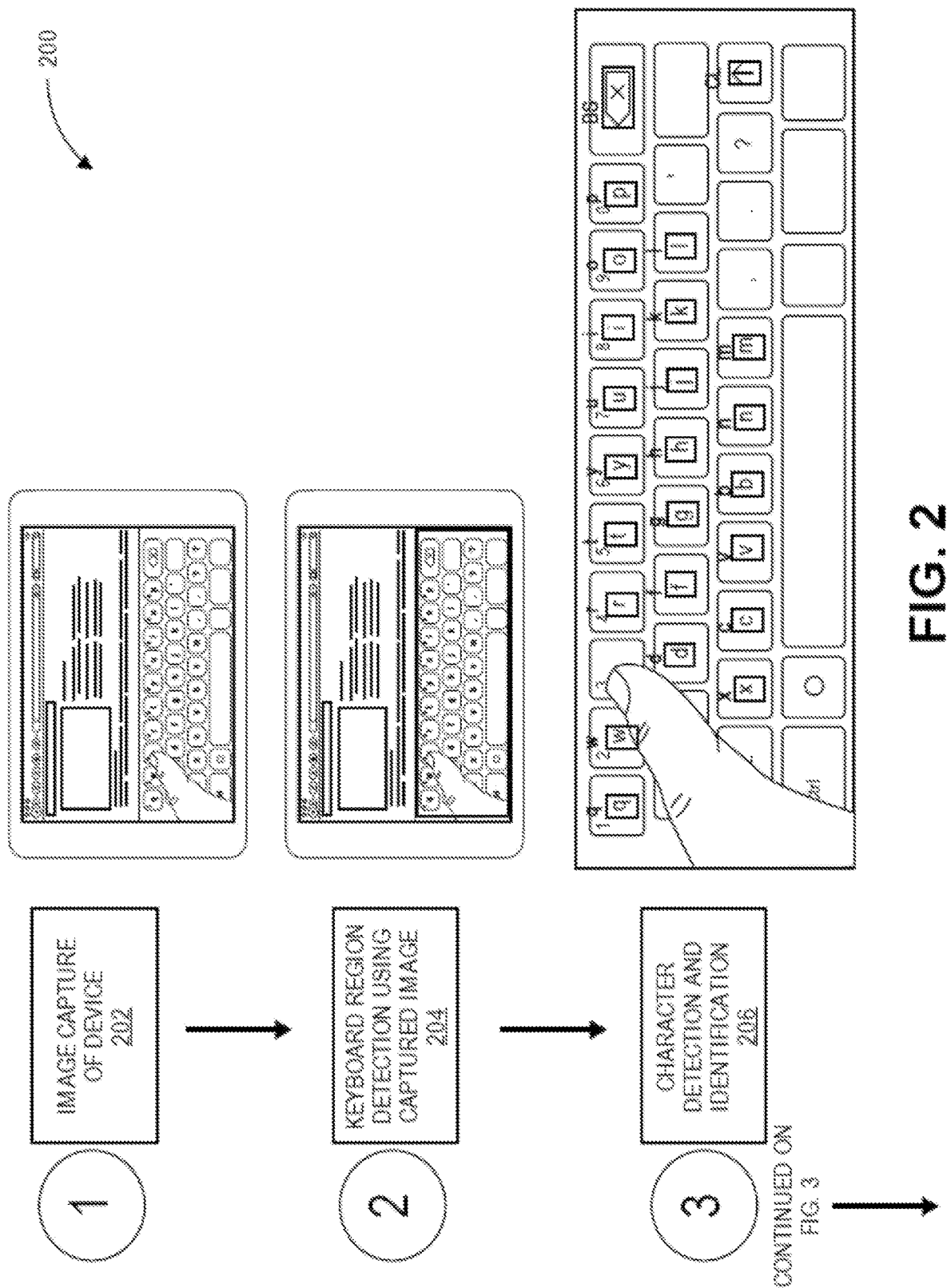
FIG. 2 depicts an example workflow for a keyboard detection feature, in accordance with at least one embodiment.

FIG. 2 depicts an example workflow for a keyboard detection feature, in accordance with at least one embodiment. The workflow 200 of FIG. 2 for a keyboard detection feature includes operation 1 which corresponds to receiving an image of a device at 202. As described herein and with reference to FIG. 1, an image of the device may be captured by a camera of a robot-assisted system. In embodiments, the keyboard detection feature described herein may be configured to detect the keyboard region as well as detect and recognize the characters in the keyboard region of an image without access to the robot-assisted system. In accordance with at least one embodiment, a computer system, such as the service provider computers, may utilize the keyboard detection feature to detect the keyboard region, detect and recognize the isolated characters in the keyboard region, group the characters into lines or one or more groups, and identify and correct any errors without communicating with a robot-assisted system to perform movements which interact with the device. The workflow 200 of FIG. 2 may include at operation 2, detecting the keyboard region of the device in the image at 204.

In accordance with at least one embodiment, the keyboard detection feature may use a keyboard detection algorithm that is configured to detect the portion of the image of the device that corresponds to the keyboard region of the device. The keyboard detection algorithm may compare the image of the device with images of keyboard regions for a plurality of devices for identifying the bounds within the pixels of the image that correspond to the keyboard region of the device. In embodiments, the keyboard detection algorithm may detect one or more keyboard regions in an image for devices that include multiple keyboards or keyboard regions. The keyboard detection algorithm may detect a keyboard region of a device despite different backgrounds or different surrounding environments (other user interface objects). The workflow 200 of FIG. 2 may include, at operation 3, detecting and identifying the characters at 206 within the keyboard region 204. The keyboard detection feature may include using a character detection algorithm that detects and identifies or recognizes the isolated characters included in the keyboard region of the image of the device. Similar to the keyboard detection algorithm, the character detection algorithm may utilize a plurality of images of characters to compare to the detected characters in the keyboard region to identify or recognize the character. The character detection algorithm may be configured to assign or associate each recognized character with a unique class that corresponds to a particular alpha-numeric character or a control character of a keyboard.

Figure 3:
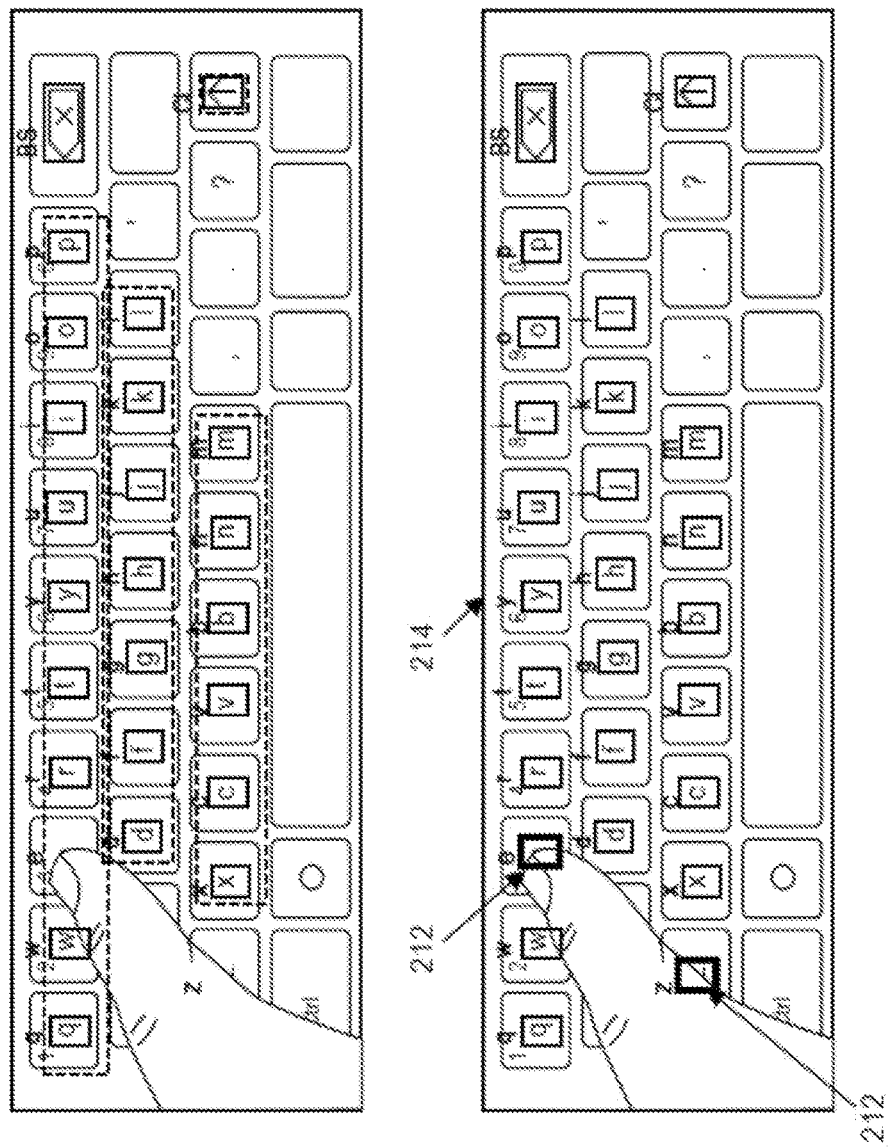
FIG. 3 depicts an example workflow for a keyboard detection feature, in accordance with at least one embodiment.

FIG. 3 depicts an example workflow for a keyboard detection feature, in accordance with at least one embodiment. FIG. 3 continues the workflow 200 of FIG. 2 at operation 4 which may include building text lines for detected characters at 208. In embodiments, the keyboard detection feature may group the detected and recognized characters into one or more groups or lines based at least in part on their location within the keyboard region and a size associated with each character. In embodiments, images of detected keyboard regions and characters may be utilized to group the characters in a keyboard region of an image into a particular group. The keyboard detection feature may group alpha-numeric characters that do not correspond to the special control characters into groups. An orientation of the device in the image or the detected keyboard region in the image may be utilized to group the characters into one or more groups. For example, the characters that share a horizontal orientation with respect to the device may be grouped into the same group.

The workflow 200 of FIG. 3 includes operation 5 which may include applying an error detection algorithm to identify and correct errors in the detected and recognized characters 210 included in the groups or text lines at operation 4. For example, FIG. 3 illustrates at 212 several characters that are occluded by a human finger in the image of the keyboard region 214. The error detection algorithm may be configured to: identify characters that are occluded in the image (e.g., 212) and insert the appropriate character based on a similar grouping of characters from a similar keyboard region maintained by the service provider computers and/or robot-assisted system; delete false positive characters that were detected and recognized by the character detection algorithm but that do not conform to the similar grouping of characters for the particular group or text line; and fix incorrect characters such as by replacing a character for another character (e.g., a "i" for a "j").

Figure 4:
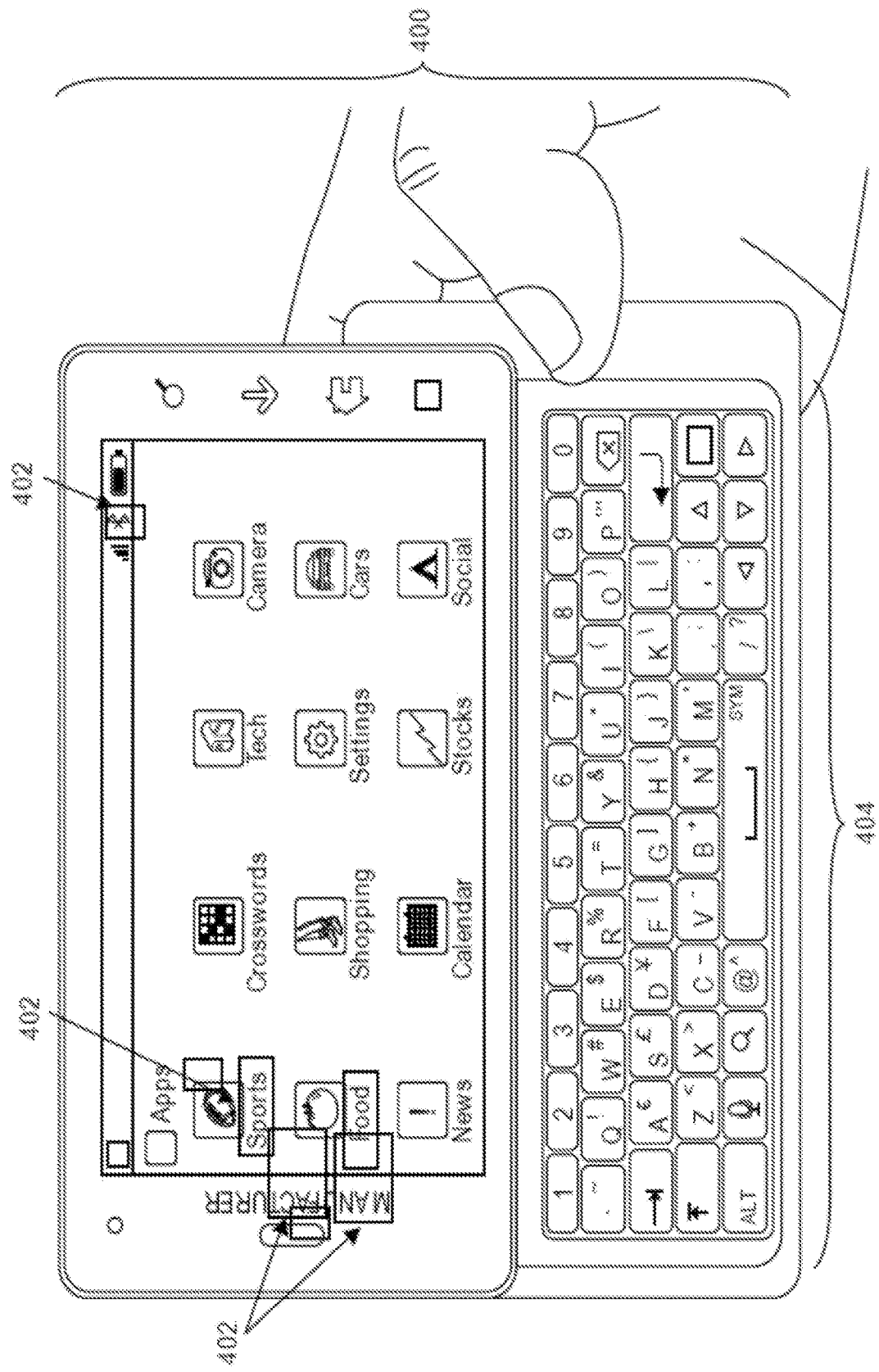
FIG. 4 depicts an example output from a conventional character recognition system using an image of a device.

FIG. 4 depicts an example output from a conventional character recognition system using an image of a device. FIG. 4 includes an image 400 of a device that includes highlighted areas (402) that represent one or more detected phrases or incorrect characters utilizing conventional character recognition or optical character recognition techniques. Note how the conventional character recognition system ignores the keyboard region of the device at 404 and attempts to identify words or phrases only at 402. Conventional character recognition systems may lack any error correction algorithms that attempt to correct the detection performed on an image of a device.

Figure 5:
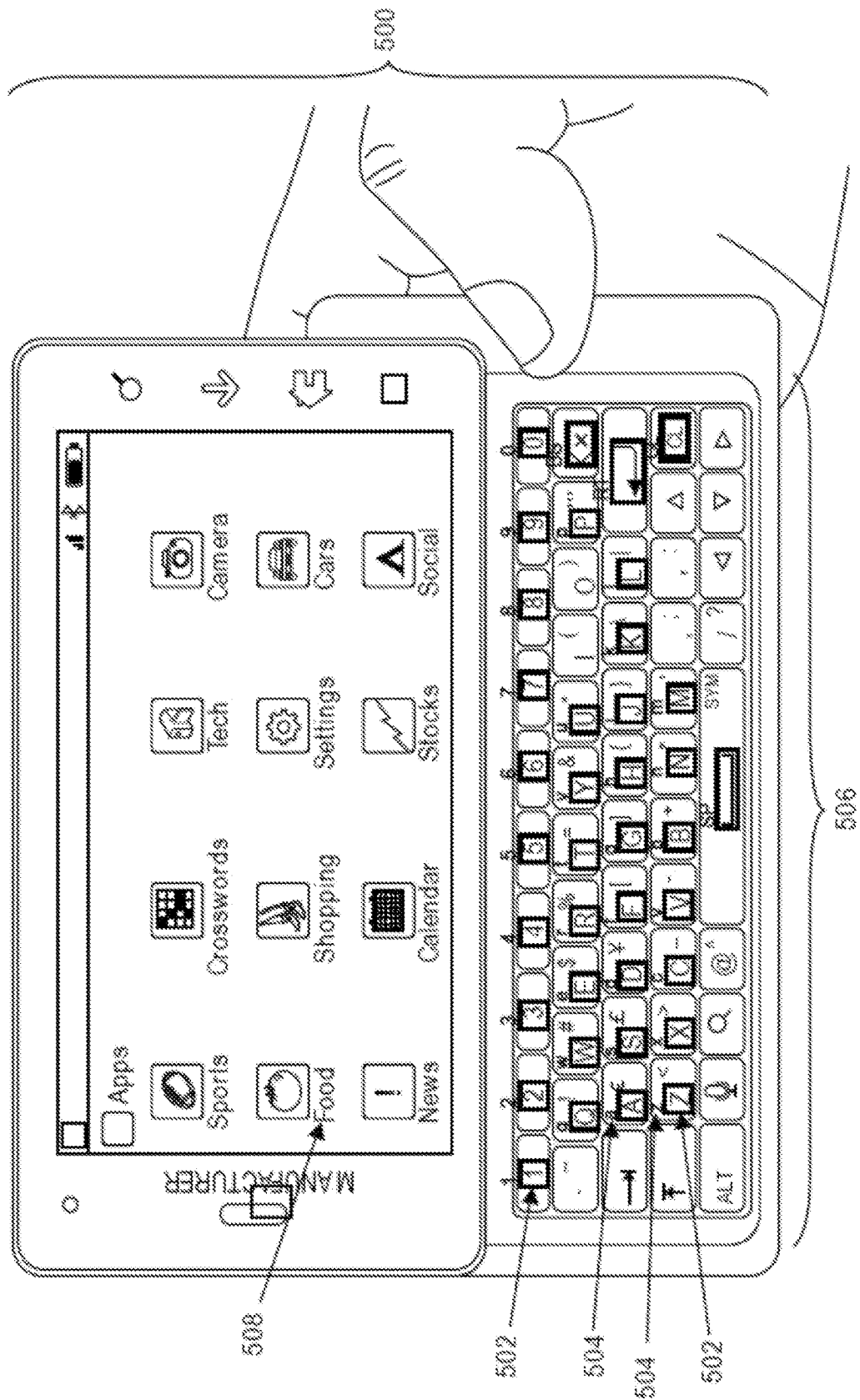
FIG. 5 depicts an example output from the keyboard detection feature using an image of a device, in accordance with at least one embodiment.

FIG. 5 depicts an example output from the keyboard detection feature using an image of a device, in accordance with at least one embodiment. FIG. 5 includes an image 500 of the same device from FIG. 4 but applying the keyboard detection features described herein. It should be noted that the keyboard detection features described herein can be implemented and applied to an image of a device outside or without the use of the robot-assisted system described in the current disclosure. The image 500 of FIG. 5 includes a representation of detected characters at 502 as well as corresponding identified or recognized characters at 504. Using the keyboard detection features described herein the characters 502 and 504 are identified for the keyboard region 506 while ignoring the other parts of the device 508 which correspond to a different portion of the image 500. The keyboard detection feature also utilizes unique classes to detect and correctly identify special characters that correspond to control characters such as the "RT" for the return key of the device.

Figure 6:
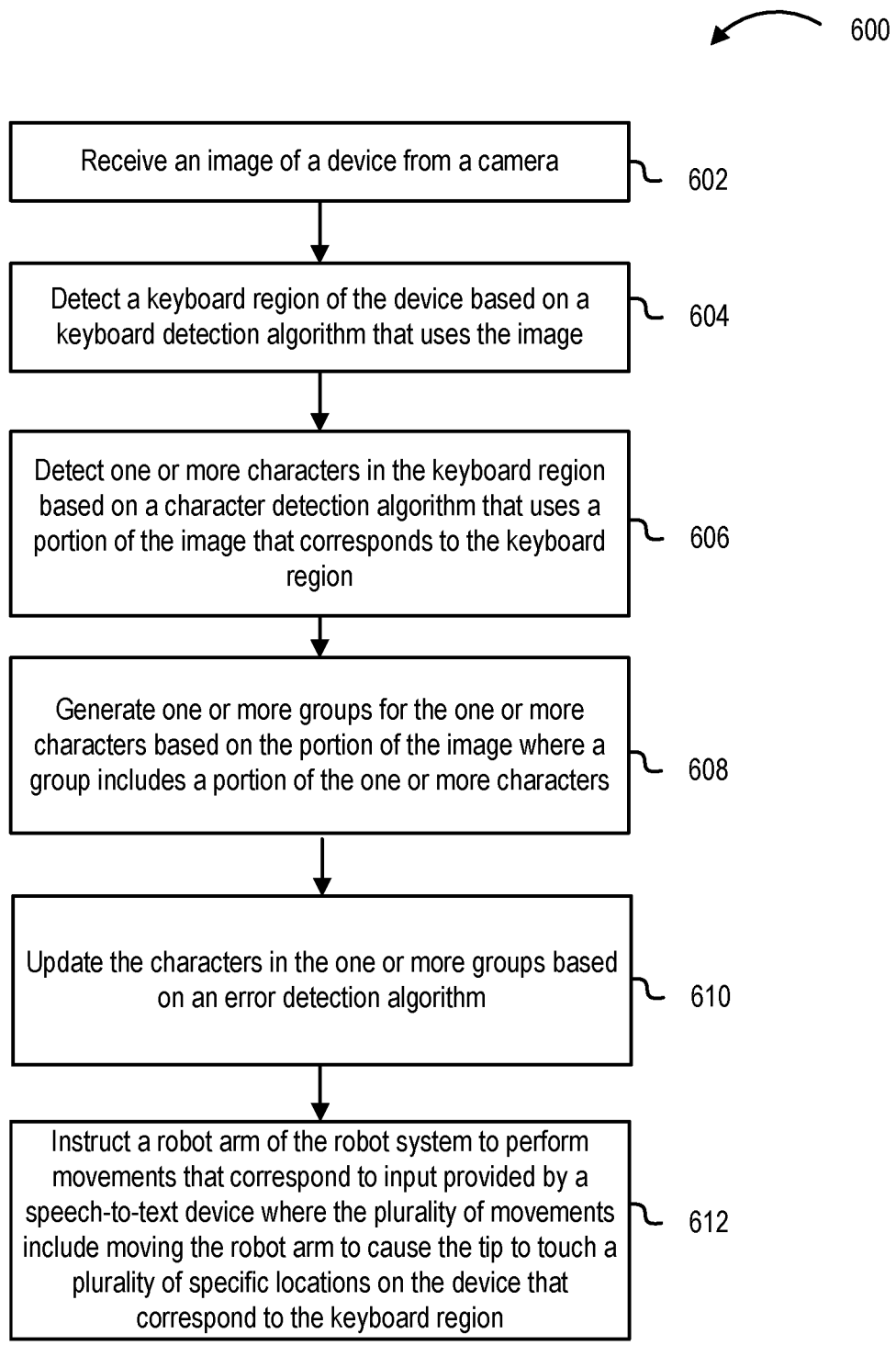
FIG. 6 depicts a flowchart of a keyboard detection feature, in accordance with at least one embodiment.
Figure 7:
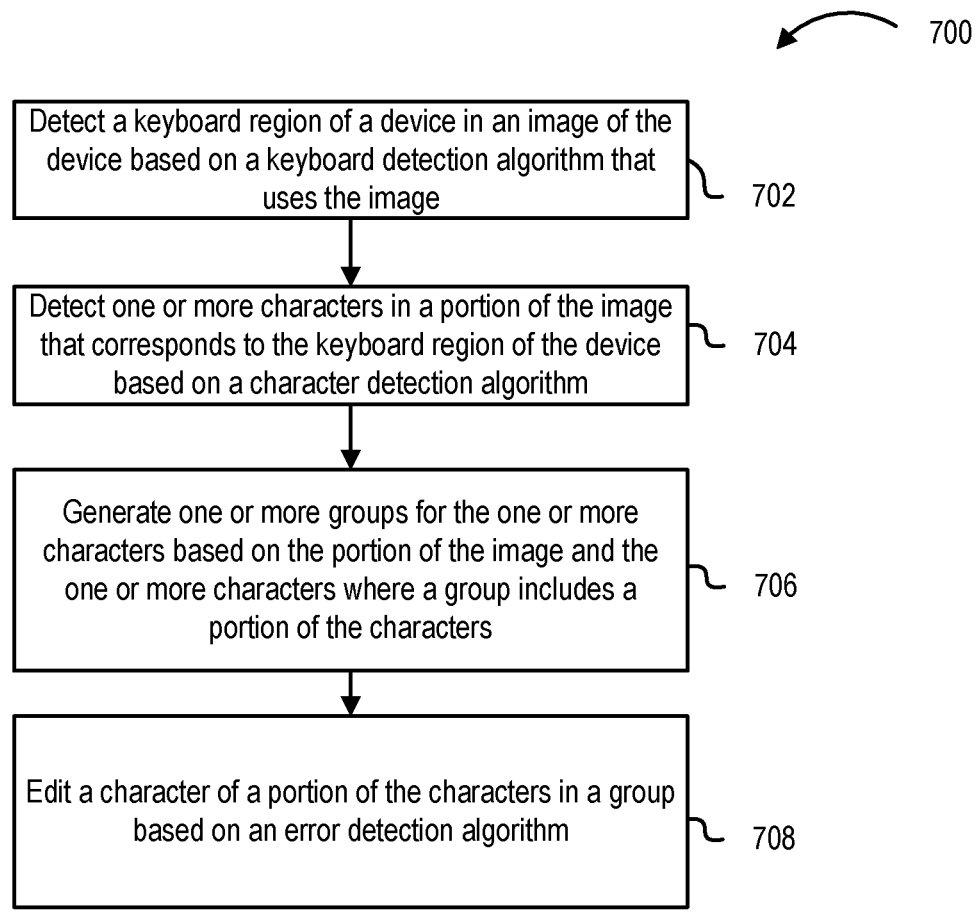
FIG. 7 depicts a flowchart of a keyboard detection feature, in accordance with at least one embodiment.

FIGS. 6 and 7 depict example flow charts for keyboard detection features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
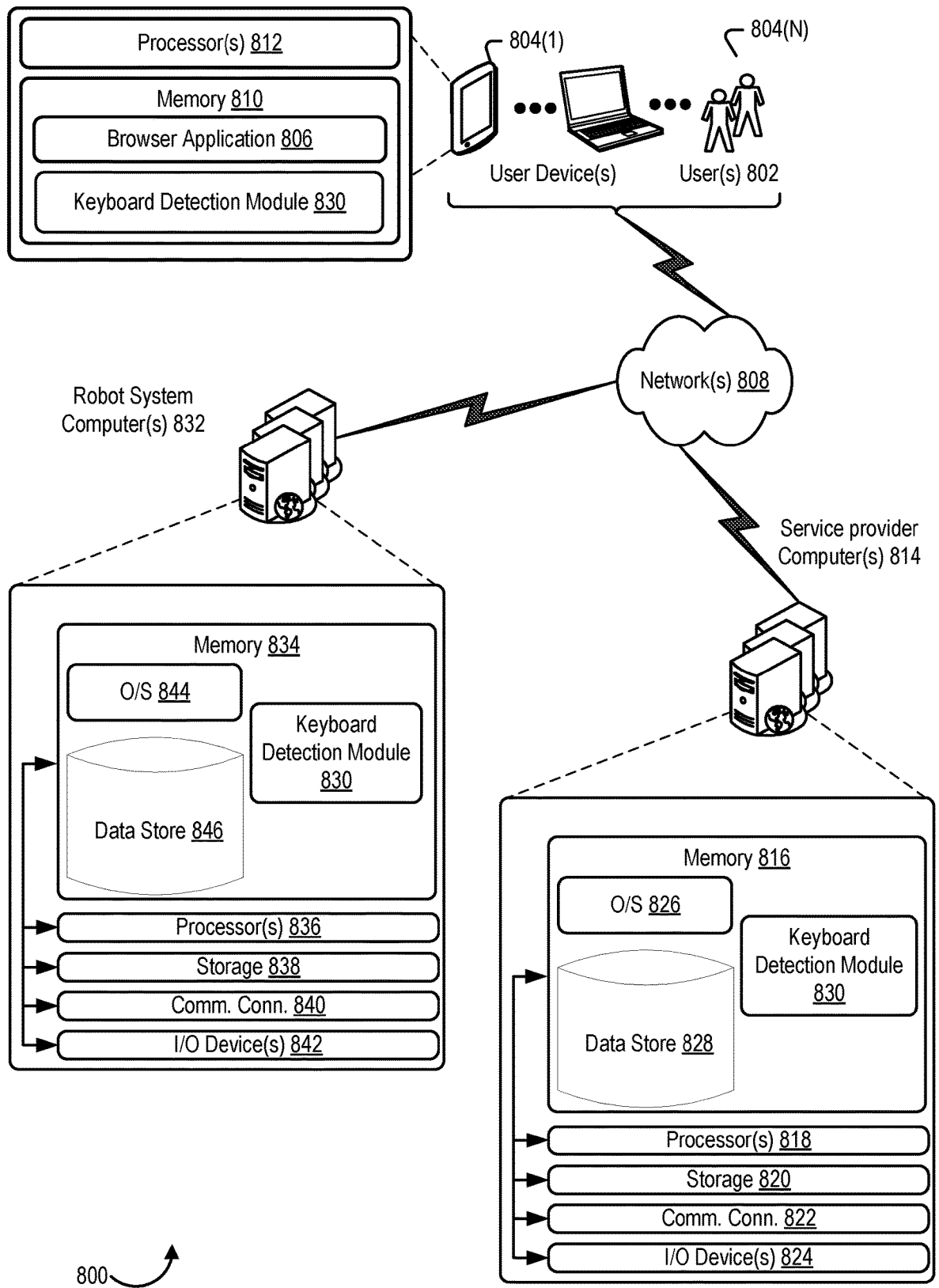
FIG. 8 depicts an example architecture for a keyboard detection feature as described herein that includes one or more service provider computers, robot system computers, and/or a user device connected via one or more networks, in accordance with at least one embodiment.

In some examples, the user device (804), robot system computers (robot system computers 832), or service provider computers (service provider computers 814) utilizing at least the keyboard detection module 830 depicted in FIG. 8 may perform the processes 600 and 700 of FIGS. 6 and 7. In FIG. 6, the process 600 may include receiving an image of a device from a camera at 602. For example, the system implementing the keyboard detection feature described herein may analyze a frame or successive frames from a video or an image captured by a camera of a device. In embodiments, process 600 may include detecting a keyboard region of the device based at least in part on a keyboard detection algorithm that uses the image at 604. In accordance with at least one embodiment, a keyboard detection algorithm may be trained with tens of thousands of images of keyboard regions of various devices and the keyboard detection feature may utilize the algorithm to compare the received image with one of the images in the keyboard detection algorithm to identify a keyboard region for the device in the image. The process 600 may include detecting one or more characters in the keyboard region based at least in part on a character detection algorithm that uses a portion of the image that corresponds to the keyboard region at 606. In embodiments, the character detection algorithm may be trained with tens of thousands of images of characters in keyboard regions for a plurality of devices to identify particular characters included in the keyboard region of an image of a device.

The process 600 may include generating one or more groups for the one or more characters based at least in part on the portion of the image where a group includes a portion of the one or more characters at 608. In embodiments, the one or more groups may represent a text line comprised of the characters that correspond to a horizontal orientation of the keyboard region of a device. For example, a group may include the characters "qwertyuiop" on a standard mechanical keyboard. The process 600 may include updating the characters in the one or more groups based at least in part on an error detection algorithm at 610. In embodiments, the error detection algorithm may identify and correct errors associated with occluded characters (e.g., characters that are occluded in the image but that are normally associated with a text line or group of the keyboard region for the device), delete false positive characters (e.g., remove a character that was falsely identified by the character detection algorithm), and fix incorrect characters (e.g., remove or add characters that are associated with a particular text line or group for the keyboard region of the device that were missed or incorrectly identified, such as a lower case "1" for a capital "I"). The process 600 may conclude at 612 by instructing a robot arm of a robot system to perform movements that correspond to input provided by a speech-to-text device where the plurality of movements include moving the robot arm to cause the tip to touch a plurality of specific locations on the device that correspond to the keyboard region. In accordance with at least one embodiment, a user may provide voice commands which are received and converted to text by an associated speech-to-text device in communication with the robot system. The text can be interpreted as commands which include interacting with the device using a robot arm and tip or manipulator. For example, the input of the voice command may correspond to an instruction to type out a phrase or certain characters on the device via the robot arm and tip.

In accordance with at least one embodiment, the character detection algorithm that identifies particular characters in the keyboard region of the image of the device may be configured to associate each character with a unique class that is associated with a particular character. For example, there may be a unique class for a lower case "p" and another unique class for an upper case "P." In embodiments, the robot-assisted system may be configured to verify the speech-to-text input provided by a user and a corresponding voice command by identifying that the detected characters in the keyboard region support the input. For example, the voice command may correspond to "type 4!!" The current state of the keyboard of the device, in cases where the device utilizes a digital keyboard that needs to switch between states to access various characters, may not support the exclamation points in the above example. In such cases, the system may be configured to utilize an output device to instruct the user to provide voice commands which switch the state of the device. In accordance with at least one embodiment, the robot-assisted system may be configured to execute a set of commands or movements with the tip interacting with the device in order to put the device into a state to receive input associated with the voice commands. For example, the robot-assisted system may execute a plurality of movements and interactions with the tip on the device to turn on, unlock, or access a specific application on the device. In embodiments, the keyboard detection feature may include determining a pixel-to-coordinate grid or system to associate with the keyboard region of the device and the detected characters to enable the robot arm and tip to interact with the device by converting the pixel position to a coordinate system that can be interpreted by the robot-assisted system to interact with the device.

In FIG. 7 the process 700 may include detecting a keyboard region of a device in an image of the device based at least in part on a keyboard detection algorithm that uses the image of the device at 702. In embodiments, the image may be captured by a camera. The process 700 may include detecting one or more characters in a portion of the image that corresponds to the keyboard region of the device based at least in part on a character detection algorithm at 704. The process 700 may include generating one or more groups for the one or more characters based at least in part on the portion of the image and the one or more characters where the group includes a portion of the characters at 706. The process 700 may include editing a character of a portion of the characters in a group based at least in part on an error detection algorithm at 708. In embodiments, the robot-assisted system including a camera may capture or obtain an image of the keyboard region periodically or upon executing a command or movement with the robot arm and tip. For example, the camera may be configured to capture and provide each frame of a video of a device or an image of a device for detecting a keyboard region or a change in the state of the keyboard for a device. The camera may be configured to capture and provide the frame of a video of a device or an image of the device upon each interaction by the robot arm and tip with the device. In embodiments, the keyboard detection feature may include a historical analysis of input from voice commands provided by a user to identify particular utilizes phrases such as "read" as opposed to "reed." The robot-assisted system may utilize an output component, such as a speaker, to verify input provided by a user in a voice command. For example, the system may convert the speech-to-text input included in a voice command to an output file that includes the identified input such as by outputting, via a speaker, the phrase "Did you mean to type weather?" The keyboard region detection algorithm described herein may be configured to identify a plurality of keyboard regions for a device that includes one or more keyboards that are included in an image of the device.

FIG. 8 depicts an example architecture for a keyboard detection feature as described herein that includes one or more service provider computers, robot system computers, and/or a user device connected via one or more networks, in accordance with at least one embodiment. In architecture 800, one or more users 802 (e.g., customers, users, consumers etc.) may utilize user computing devices 804(1)-(N) (collectively, user devices 804) to provide voice commands (user input) that can be converted from speech to text by a speech-to-text application or associated device (not pictured) to inputs that can be performed by a robot-assisted system (robot system computers 832) to interact with the user device 804. Specifically, the robot-assisted system may interpret the voice commands and carry out a set of movements of a robot arm and tip or manipulator to interact with the user device 804 to implement the input included in the voice command (e.g., typing out the phrase "search for pictures of puppies" in a search bar of a search engine on the user device 804). The user device 804 may present a user interface of an application such as a browser application 806 or a user interface (UI) accessible through the browser application 806, via one or more networks 808, with which the robot-assisted system may interact with via a robot arm and tip upon the identification of the keyboard region and specific characters included in the keyboard region of the user device 804 as described herein. In embodiments, the one or more users 802 may utilize user computing devices 804(1)-(N) and the robot-assisted system (robot system computers 832) to access the browser application 806 or a UI accessible through the browser application 806, to request content, access specific applications, type out words or implement other appropriate input as identified in the voice commands provided by the user 802. The "browser application" 806 can be any browser control or native application that can access and display a network page or other information such as a user interface of a native software application. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806 and/or the robot system computers 832 such as a speech-to-text device or application (not pictured).

The user devices 804 may include at least one memory 810 and one or more processing units or processor(s) 812. The memory 810 may store program instructions that are loadable and executable on the processor(s) 812, as well as data generated during the execution of these programs.

Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM.

Turning to the contents of the memory 810 in more detail, the memory 810 may include an operating system and one or more application programs or services for implementing the features disclosed herein including keyboard detection module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, electronic marketplace operations, serving content associated with an electronic marketplace, and fulfilling orders made via the electronic marketplace, etc. The service provider computers 814 may implement or be an example of the service provider computer(s) described herein and throughout the disclosure. The one or more service provider computers 814 may also be operable to provide site hosting, media streaming services, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represents the users 802 or user devices 804 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the keyboard detection module 830.

In accordance with at least one embodiment, the keyboard detection module 830 may be configured to receive or obtain an image of a user device 804 and using one or more algorithms identify a keyboard region of the device and further identify specific characters included in the keyboard region of the device. In embodiments, the keyboard detection module 830 may be configured to group the detected characters into one or more groups that coincide with text lines of an orientation of the keyboard region for the user device 804. The keyboard detection module 830 may utilize error detection algorithms to correct or update the detected characters included in the groups or text lines such as by inserting characters that are occluded in the image of the device, delete false positive characters, and fix incorrect characters. In embodiments, the keyboard detection module 830 may be configured to map a pixel-to-coordinate system for the keyboard region of the device and instruct the robot-assisted system to move a robot arm and interact with the user device 804 via a tip or manipulator to carry out input included in voice commands provided by the user 802.

The robot system computers 832 may be any type of computing devices such as, but not limited to, a mobile phone, a smart phone, a personal digital assistant (PDA), a laptop computer, a desktop computer, a server computer, a thin-client device, a tablet PC, a robot-assisted system that includes a device mounting station, a camera, a robot arm that includes a tip or manipulator, etc. In some examples, the robot system computers 832 may be in communication with the user device 804 and/or the service provider computers 814 via the networks 808, or via other network connections. The robot system computers 832 may include one or more servers, perhaps arranged in a cluster or as individual servers not associated with one another.

In one illustrative configuration, the robot system computers 832 may include at least one memory 834 and one or more processing units or processor(s) 836. The processor(s) 836 may be implemented as appropriate in hardware, computer-executable instructions, firmware, or combination thereof. Computer-executable instruction or firmware implementations of the processor(s) 836 may include computer-executable or machine-executable instructions written in any suitable programming language to perform the various functions described when executed by a hardware computing device, such as a processor. The memory 834 may store program instructions that are loadable and executable on the processor(s) 836, as well as data generated during the execution of these programs. Depending on the configuration and type of the inventory management computers 832, the memory 834 may be volatile (such as RAM) and/or non-volatile (such as ROM, flash memory, etc.). The robot system computers 832 or servers may also include additional storage 838, which may include removable storage and/or non-removable storage. The additional storage 838 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 834 may include multiple different types of memory, such as SRAM, DRAM, or ROM.

The memory 834, the additional storage 838, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 834 and the additional storage 838 are all examples of non-transitory computer storage media. Additional types of non-transitory computer storage media that may be present in the robot system computers 832 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the robot system computers 832. Combinations of any of the above should also be included within the scope of non-transitory computer-readable media.

The robot system computers 832 may also contain communication connection interface(s) 840 that allow the robot system computers 832 to communicate with a data store, another computing device or server, user terminals, and/or other devices on the networks 808 as well as with an associated or communicatively coupled speech-to-text device (not pictured) or a robot arm with a tip or manipulator. The robot system computers 832 may also include I/O device(s) 842, such as a keyboard, a mouse, a pen, a voice input device, a touch input device, a display, speakers, a printer, a robot arm with tip or manipulator, a mounting station, a camera, etc.

Turning to the contents of the memory 834 in more detail, the memory 834 may include an operating system 844, one or more data stores 846, and/or one or more application programs or services for implementing the features disclosed herein including the keyboard detection module 830. In accordance with at least one embodiment, the keyboard detection module 830 may be configured to receive or obtain an image of a user device 804 and using one or more algorithms identify a keyboard region of the device and further identify specific characters included in the keyboard region of the device. In embodiments, the keyboard detection module 830 may be configured to group the detected characters into one or more groups that coincide with text lines of an orientation of the keyboard region for the user device 804. The keyboard detection module 830 may utilize error detection algorithms to correct or update the detected characters included in the groups or text lines such as by inserting characters that are occluded in the image of the device, delete false positive characters, and fix incorrect characters. In embodiments, the keyboard detection module 830 may be configured to map a pixel-to-coordinate system for the keyboard region of the device and instruct the robot-assisted system to move a robot arm and interact with the user device 804 via a tip or manipulator to carry out input included in voice commands provided by the user 802.

Figure 9:
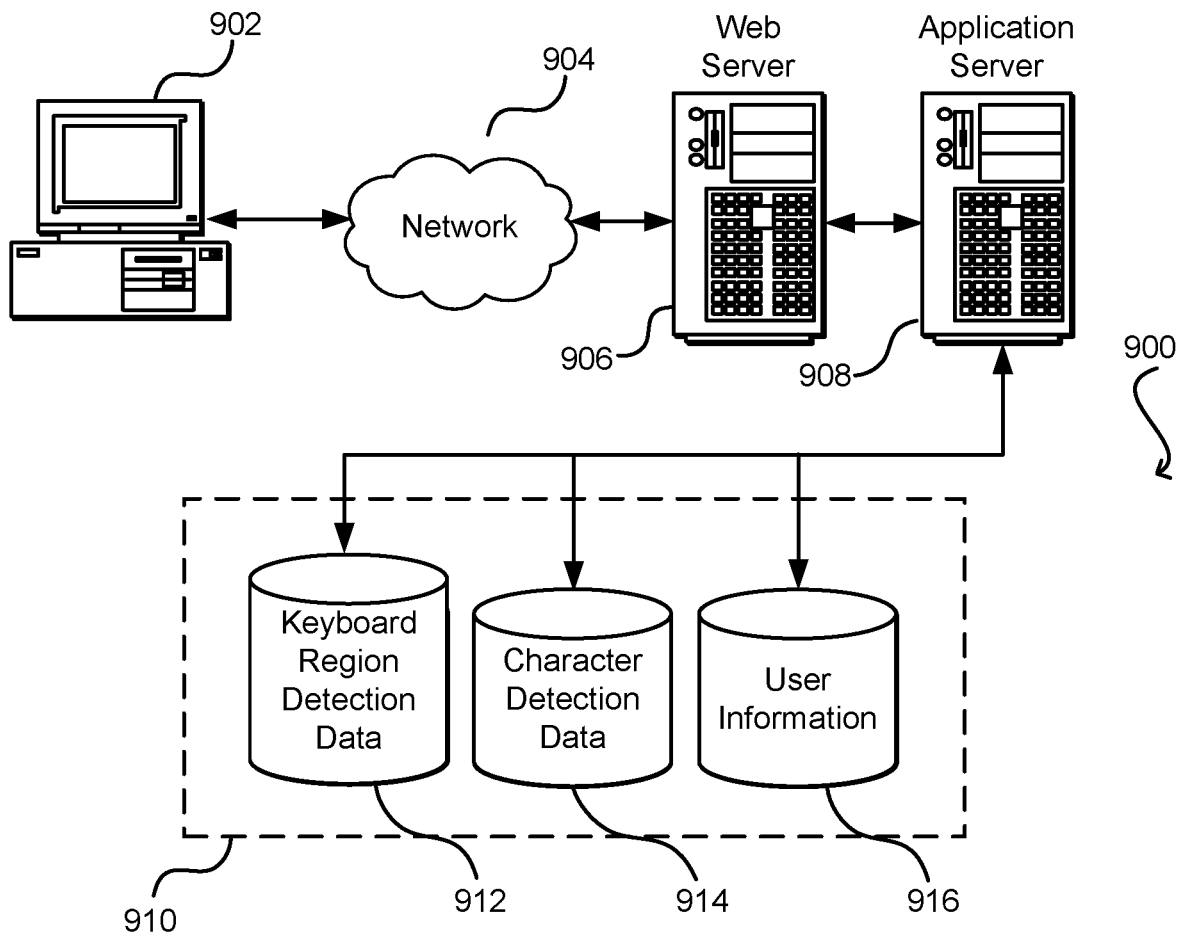
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing keyboard region detection data 912 and user information 916, which can be used to serve content for the production side as well as train algorithms (e.g., a supervised machine learning algorithm) using images of keyboard regions for a plurality of devices to identify a keyboard region in an image of a device. The data store also is shown to include a mechanism for storing character detection data 914, which can be used for reporting, analysis, or other such purposes such as updating and training a character detection algorithm (e.g., a supervised machine learning algorithm) that can use images of characters on keyboards to identify a specific character included in a keyboard region of a device. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers.

The server(s) also may be capable of executing programs or scripts in response to requests from user devices, such as by executing one or more Web applications that may be implemented as one or more scripts or programs written in any programming language, such as Java °, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A robot-assisted system for implementing speech-to-text commands on a device, the robot-assisted system comprising:
    a device mounting station configured to physically hold the device;
    a camera configured to captures images of the device while the device is mounted in the device mounting station;
    a robot arm having a tip configured to contact the device;
    a controller having a processor and memory containing executable instructions that, when executed by the processor, cause the controller to:
        receive an image of the device from the camera;
        detect a keyboard region of the device based at least in part on a keyboard detection algorithm that uses the image;
        detect one or more characters in the keyboard region based at least in part on a character detection algorithm that uses a portion of the image that corresponds to the keyboard region;
        generate one or more groups for the one or more characters based at least in part on the portion of the image that corresponds to the keyboard region and the one or more characters, a group of the one or more groups including characters of the one or more characters;
        update the characters in the one or more groups based at least in part on an error detection algorithm; and
        instruct the robot arm to perform a first plurality of movements that correspond to input provided by a speech-to-text device in communication with the robot-assisted system, the first plurality of movements including moving the robot arm to cause the tip to touch a plurality of specific locations on the device that correspond to the keyboard region.

2. The robot-assisted system of claim 1, wherein the error detection algorithm includes identifying an occluded character in the one or more characters of the keyboard region based at least in part on the group, and wherein updating the characters in the one or more groups includes inserting a character that corresponds to the occluded character.

3. The robot-assisted system of claim 1, wherein the error detection algorithm includes identifying a false positive character in the one or more characters of the keyboard region based at least in part on the group, and wherein updating the characters in the one or more groups includes removing a character that corresponds to the false positive character.

4. The robot-assisted system of claim 1, wherein the error detection algorithm includes identifying a character in the one or more characters of the keyboard region based at least in part on the group, and wherein updating the characters in the one or more groups includes replacing the character.

5. The robot-assisted system of claim 1, wherein the character detection algorithm includes associating each character of the one or more characters with a unique class, the unique class associated with a particular alpha-numeric character.

6. The robot-assisted system of claim 1, wherein the executable instructions when executed by the processor further cause the controller to verify the input provided by the speech-to-text device based at least in part on comparing alpha-numeric characters of the input to the updated characters in the one or more groups.

7. The robot-assisted system of claim 1, wherein the executable instructions when executed by the processor further cause the controller to instruct the robot arm to perform a second plurality of movements that initiate a state for the device that is associated with receiving the input.

8. The robot-assisted system of claim 1, wherein the executable instructions when executed by the processor further cause the controller to generate a pixel-to-coordinate map of the device based at least in part on the portion of the image that corresponds to the keyboard region and the detected one or more characters.

9. A computer-implemented method, comprising:
    receiving, by a computer system, an image of a device from a camera;
    detecting, by the computer system, a keyboard region of the device based at least in part on a keyboard detection algorithm that uses the image;
    detecting, by the computer system, one or more characters in a portion of the image that correspond to the keyboard region of the device based at least in part on a character detection algorithm;
    generating, by the computer system, one or more groups for the one or more characters based at least in part on the portion of the image that corresponds to the keyboard region and the one or more characters, a group of the one or more groups including a portion of characters of the one or more characters; and
    editing, by the computer system, a character of the portion of characters based at least in part on an error detection algorithm.

10. The computer-implemented method of claim 9, wherein the keyboard detection algorithm includes identifying an orientation of the device.

11. The computer-implemented method of claim 10, wherein generating the one or more groups for the one or more characters is further based at least in part on a horizontal orientation of the device.

12. The computer-implemented method of claim 9, further comprising detecting the keyboard region of the device based at least in part on receiving a new image of the device.

13. The computer-implemented method of claim 9, further comprising:
    identifying a first portion of upper case characters of the one or more characters and identifying a second portion of lower case characters of the one or more characters; and
    assigning an upper case or a lower case to the one or more characters based at least in part on a comparison of the first portion of the upper case characters and the second portion of the lower case characters.

14. The computer-implemented method of claim 9, wherein the character detection algorithm utilizes a plurality of characters from a plurality of languages.

15. A non-transitory computer readable medium storing specific computer-executable instructions that, when executed by a processor, cause a computer system to at least:

detect a keyboard region of a device in an image of the device based at least in part on a keyboard detection algorithm that uses the image;

detect one or more characters in a portion of the image that corresponds to the keyboard region of the device based at least in part on a character detection algorithm; and editing a character of the one or more characters in the portion of the image based at least in part on an error detection algorithm and in response to generating one or more groups for the one or more characters based at least in part on the portion of the image that corresponds to the keyboard region and the one or more characters, a group of the one or more groups including a portion of characters of the one or more characters.

16. The non-transitory computer readable medium of claim 15, wherein the computer-executable instructions when executed by the processor further cause the computer system to instruct a robot arm with a tip to interact with the device, the interaction including a plurality of movements that correspond to input provided by a speech-to-text device in communication with the robot-arm and associated with the device.

17. The non-transitory computer readable medium of claim 16, wherein the computer-executable instructions when executed by the processor further cause the computer system to detect the keyboard region in response to executing a movement of the plurality of movements.

18. The non-transitory computer readable medium of claim 16, wherein the computer-executable instructions when executed by the processor further cause the computer system to verify the input based at least in part on a historical analysis of previous input provided via the speech-to-text device compared to the input.

19. The non-transitory computer readable medium of claim 16, wherein the computer-executable instructions when executed by the processor further cause the computer system to verify the input based at least in part by generating and transmitting an audio representation of the input via an output component associated with the device.

20. The non-transitory computer readable medium of claim 15, wherein the keyboard detection algorithm is configured to detect a plurality of keyboard regions of the device based at least in part on the image.

* * * * *